Jan. 27, 1925.
A. GROSSMAN
AUTOMATIC TEMPERATURE REGULATOR
Filed Oct. 8, 1923
1,524,129
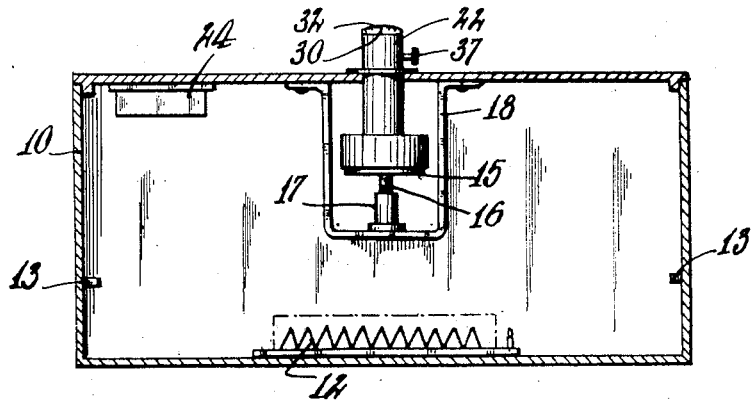
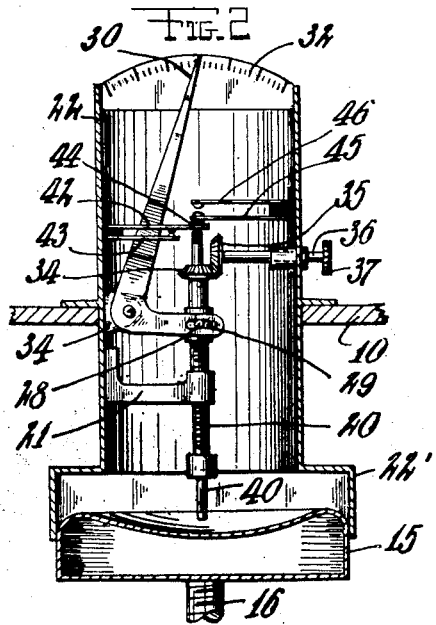
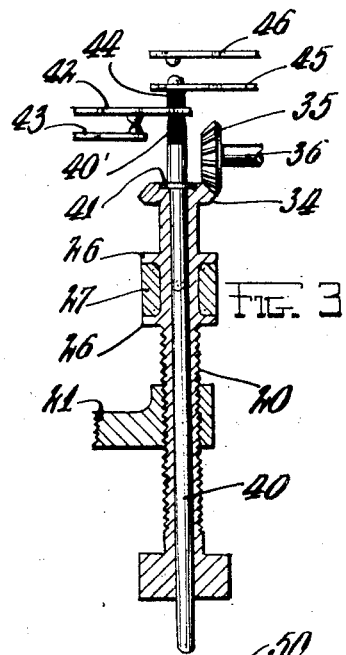
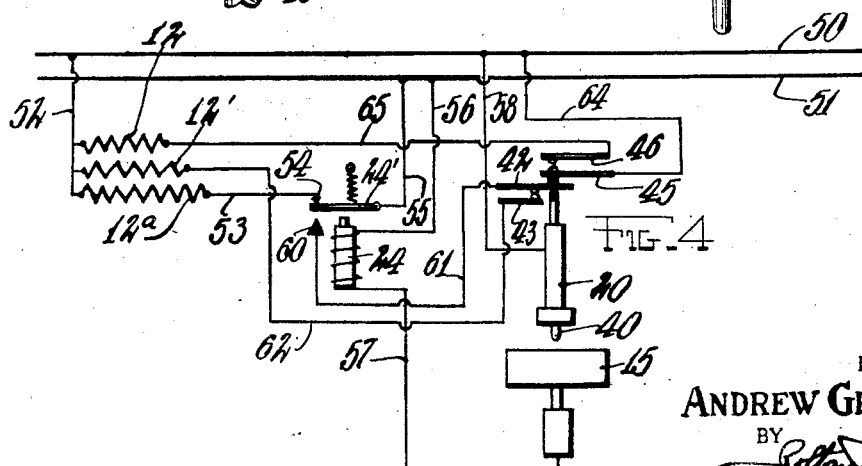
INVENTOR
ANDREW GROSSMAN Patented Jan. 27, 1925.

1,524,129

UNITED STATES PATENT OFFICE.

ANDREW GROSSMAN, OF NEW YORK, N. Y.

AUTOMATIC TEMPERATURE REGULATOR.

Application filed October 8, 1923. Serial No. 667,153.

*To all whom it may concern:*

Be it known that I, ANDREW GROSSMAN, a citizen of Hungary, residing at New York, in the county of New York and State of New York, have invented certain new and useful Improvements in Automatic Temperature Regulators, of which the following is a specification.

This invention relates generally to electrical heaters which may be used for heating incubators, or any other devices where the maintaining of an even temperature is desirable, the invention having more particular reference to the means for controlling the action of the heater to regulate the temperature.

The invention has for an object the provision of a novel and improved thermo-control device for the electric heater, which acts automatically to vary the current with variation of temperature.

For further comprehension of the invention, and of the objects and advantages thereof, reference will be had to the following description and accompanying drawing, and to the appended claims in which the various novel features of the invention are more particularly set forth.

Fig. 1 of the drawing is a vertical sectional view through an incubator having the invention applied thereto.

Fig. 2 is a vertical sectional view of the regulator.

Fig. 3 is a fragmentary vertical sectional view showing part of the regulator.

Fig. 4 is a diagram of the electric circuits.

In the drawing the reference numeral 10 indicates an incubator which may be in the main of ordinary construction. To heat the incubator I provide a heater consisting of a number of coils of wire and which are located in such position as may be desirable, being here indicated as mounted on the bottom of the incubator which is provided on its end walls with cleats 13 to receive a tray containing eggs. The respective coils of the heater are indicated at 12, 12' and 12ª and are of relatively varied capacity.

To control the heater I provide an element adapted to expand under the action of heat. This element here comprises a shallow hermetically sealed casing 15 which is filled with a volatile liquid such as ether. This casing is here shown as fixed on a screw 16 threaded into a suitable socket in a standard 17 mounted on a U-strap 18 depending from the top of the incubator. Disposed above this element 15 is a vertically extending screw 20 which is threaded through the end of an arm 21 fixed to a cylindrical member 22 extending upward through the top of the incubator. The screw 20 and thermal element 15 are in electrical contact with a relay 24 of ordinary construction and which serves a purpose to be presently made clear. The cylindrical member 22 has an enlarged lower portion 22' in which the casing 15 engages slidably.

The screw 20 presents a non-threaded portion between two circumferential flanges 26 thereon, and a collar 27 freely surrounds this unthreaded portion and is provided with a pair of projecting pins 28 which engage in slots such as 29 in the forked end of one arm of a bell crank lever 30 fulcrumed to a bracket on the cylinder 22 and having its other arm in the form of a pointer which extends upward through the open top of said cylinder and registers with a scale bar 32 extending across said open top. To adjust the screw 20 vertically a bevel gear 34 is fixed on the upper end thereof and is engaged by a like gear 35 on the inner end of a shaft 36 which extends outward through the side of the cylinder 22 above the top of the incubator and has a head 37 thereon for rotation purposes.

The screw 20 is hollow and a rod 40 extends axially therethrough, the bottom of this rod being adapted to be engaged by the element 15 to close the circuit through the relay 24. The rod 40 is loose in the screw 20 and is held in proper position by means of a flange 41 thereon which rests on the upper face of the gear 34. The upper end of this rod extends above the screw and may have an insulated tip 40' which barely touches the bottom of a spring contact 42 which is normally in engagement with a second contact 43 located under it, these contacts being mounted on a wall of the cylinder 22. The contact carries an insulating stud 44 which is normally in contact with the underside of a spring contact 45. Above this contact 45, and normally spaced therefrom, is a second contact 46, these contacts being mounted on the wall of the cylinder 22.

Referring now to the electrical connections shown in Fig. 4. The main leads from which the current is derived are numbered 50 and 51. From the lead 50 a wire 52 connects to one end of each of the heater coils, and from the opposite end of the coil 12ª a wire 53 leads to a contact 54 which is normally engaged with the armature 24' of the relay 24. From this armature 24' a wire 55 goes back to the other main lead. From the main lead 51 a wire 56 goes to the relay and from the latter a wire 57 goes to the thermal element 15. From the screw 20 a wire 58 goes back to the main lead 50. It will be apparent then that when the current is closed through the members 15 and 20, and the relay 24 energized, the circuit through wires 52 and 53 and the heater will be broken. In connection with the relay a second contact member 60 is provided and from this contact member a wire 61 leads to the spring contact 42 and from the adjacent contact 43 a wire 62 leads to the other end of the coil 12'. When the circuit is closed through the relay the current then will flow through the coil 12' only. From the main lead 50 a wire 64 goes to the contact 45 and from the adjacent contact 46 a wire 65 goes to connect to the heater coil between the ends of the latter. Normally the circuit is closed through the coil 12ª. When the temperature in the incubator rises above a selected point the expanding casing 15 engages the rod 40, closing the circuit through the relay 24. The armature 24' being attracted, the circuit is broken through the coil 12ª and closed through coil 12'. If, due to extreme mildness of the weather, the temperature in the incubator continues to rise after the circuit through the high capacity heater coil 12ª is broken, the rod 40 will be lifted, breaking the circuit from the contact point 60 to the heater coil 12', and closing the circuit to the low capacity coil 12 through the wires 64, 65 and 52.

Having thus described my invention what I claim as new and desire to protect by Letters Patent of the United States is as follows:

1. In a device of the class described, a pair of separate heater coils of different capacity, the high capacity coil being normally operative, a relay adapted when energized to cut out the said high capacity coil, a thermo-expansive element, a slidable rod adapted to be engaged by said element when the said element expands, said rod and element forming a switch in the relay circuit, and pairs of contact members controlling the circuits to the other coil and adapted to be engaged by said rod upon continued expansive movement of said element to cut out the second heater coil.

2. In a device of the class described, a plurality of separate heater coils of relatively varying capacity, wires connecting thereto a thermo-expansive element, and means whereby a circuit is selectively closed through different ones of said coils according as the said element expands or contracts.

3. In a device of the class described, a plurality of separate heater coils of relatively varying capacity wires connecting thereto a thermo-expansive element, and means whereby a circuit is selectively closed through different ones of said coils according as the said element expands or contracts, said means including a relay, and contact elements in association therewith having certain of said wires connected thereto and being adapted to be engaged by the armature of said relay respectively as the latter is energized or not.

4. In a device of the class described, a plurality of separate heater coils of relatively varying capacity wires connecting thereto at different points along its length, a thermo-expansive element, and means whereby a circuit is selectively closed through different ones of said coils according as the said element expands or contracts, said means comprising a rod adapted to be engaged by said thermo-expansive element, a member in which said rod is slidably mounted, a relay adapted to have the circuit closed therethrough when said rod is engaged by said element, and contact members for changing the circuit through said heater coils adapted to be closed by upward movement of said rod under continued expansion of said element.

In testimony whereof I have affixed my signature.

ANDREW GROSSMAN.

Witness:
HARRY L. BIRNBAUM.